United States Patent
Nakashima et al.

(10) Patent No.: US 12,297,363 B2
(45) Date of Patent: May 13, 2025

(54) ACTIVE ENERGY RAY-CURABLE INKJET PRINTING INK COMPOSITION

(71) Applicant: SAKATA INX CORPORATION, Osaka (JP)

(72) Inventors: Okinori Nakashima, Osaka (JP); Takuya Myose, Osaka (JP); Jun Kawabata, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 363 days.

(21) Appl. No.: 18/005,586

(22) PCT Filed: Jul. 8, 2021

(86) PCT No.: PCT/JP2021/025776
§ 371 (c)(1),
(2) Date: May 25, 2023

(87) PCT Pub. No.: WO2022/024706
PCT Pub. Date: Feb. 3, 2022

(65) Prior Publication Data
US 2023/0287229 A1   Sep. 14, 2023

(30) Foreign Application Priority Data
Jul. 29, 2020   (JP) .................. 2020-128740

(51) Int. Cl.
C09D 11/38 (2014.01)
C09D 11/32 (2014.01)
B41M 5/00 (2006.01)
C09D 11/101 (2014.01)

(52) U.S. Cl.
CPC .............. *C09D 11/38* (2013.01); *C09D 11/32* (2013.01); *B41M 5/0023* (2013.01); *C09D 11/101* (2013.01)

(58) Field of Classification Search
CPC ....... C09D 11/101; C09D 11/32; C09D 11/38; B41M 7/0081; B41M 5/0023; B41M 5/0047; B41J 11/0021; B41J 2/01; B41J 11/00214; C09B 68/423
See application file for complete search history.

(56) References Cited

U.S. PATENT DOCUMENTS

| | | | |
|---|---|---|---|
| 2011/0124768 A1 | 5/2011 | Claes et al. | |
| 2011/0236647 A1 | 9/2011 | Tsuchiya et al. | |
| 2016/0168177 A1 | 6/2016 | Cunningham et al. | |
| 2016/0251527 A1* | 9/2016 | Okamoto | C09D 11/101 522/39 |
| 2017/0009091 A1* | 1/2017 | Herlihy | C09D 11/103 |
| 2018/0127606 A1 | 5/2018 | Illsley | |
| 2018/0273787 A1* | 9/2018 | Herlihy | C09D 11/328 |
| 2018/0371276 A1 | 12/2018 | Miyano | |
| 2019/0085196 A1 | 3/2019 | Illsley et al. | |
| 2020/0102468 A1 | 4/2020 | Chopra et al. | |
| 2021/0214568 A1* | 7/2021 | Konda | B41M 5/0023 |

FOREIGN PATENT DOCUMENTS

| | | |
|---|---|---|
| CN | 101835855 A | 9/2010 |
| EP | 3369791 A1 | 9/2018 |
| JP | 2008507598 A | 3/2008 |
| JP | 2009035650 A | 2/2009 |
| JP | WO2007074768 A1 | 6/2009 |
| JP | 2016535131 A | 11/2016 |
| JP | 2018168321 A | 11/2018 |
| JP | 2018188581 A | 11/2018 |
| JP | 2019056111 A | 4/2019 |
| JP | 2020056017 A | 4/2020 |
| JP | 2020100777 A | 7/2020 |
| WO | 2006085992 A2 | 8/2006 |
| WO | 2007074768 A1 | 7/2007 |

(Continued)

OTHER PUBLICATIONS

International Search Report (ISR) mailed Sep. 28, 2021, issued for International application No. PCT/JP2021/025776. (3 pages).
International Preliminary Report on Patentability, dated Jan. 31, 2023, for corresponding international application PCT/JP2021/025776 (1 page).
Notification Concerning Transmittal of International Preliminary Report on Patentability, mailed Feb. 9, 2023, for corresponding international application PCT/JP2021/025776 (1 page).
Notification of Transmittal of Translation of the International Preliminary Report on Patentability, mailed Feb. 9, 2023, for corresponding international application PCT/JP2021/025776 (1 page).
Written Opinion of the International Searching Authority, mailed Sep. 28, 2021, for corresponding international application PCT/JP2021/025776 (3 pages).

(Continued)

*Primary Examiner* — John Zimmermann
(74) *Attorney, Agent, or Firm* — Law Office of Katsuhiro Arai

(57) ABSTRACT

An active energy ray-curable inkjet printing ink composition satisfies requirements A to E below is provided: (A) the content of amine-modified oligomer is 1.0 to 20.0% by mass; (B) alkoxy group-containing (meth)acrylate monomers are contained by 2.0 to 20.0% by mass; (C) (meth)acrylate monomers having an alkyl group with 6 to 20 carbon atoms is contained by 2.0 to 25.0% by mass; (D) at least one type selected from the group that consists of 1,6-hexanediol diacrylate, 3-methyl-1,5-pentanediol diacrylate, dipropylene glycol diacrylate, 1,10-decanediol diacrylate, propoxylated(2)neopentyl glycol diacrylate, and hydroxypivalic acid neopentyl glycol diacrylate is contained by 30.0 to 60.0% by mass; (E) as photopolymerization initiators, ethoxy(2,4,6-trimethylbenzoyl)phenylphosphine oxide is contained by 3.0 to 15.0% by, and oligo(2-hydroxy-2-methyl-1-(4-(1-methylvinyl)phenyl)propanone) and/or 2-hydroxy-1-{4-[4-(2-hydroxy-2-methylpropionyl)phenoxy]phenyl}-2-methylpropanone is/are contained by 2.0 to 10.0% by mass, where the total content of photopolymerization initiators is 6.0 to 25.0% by mass.

20 Claims, No Drawings

(56) References Cited

FOREIGN PATENT DOCUMENTS

| | | |
|---|---|---|
| WO | 2009148124 A1 | 12/2009 |
| WO | 2016186838 A1 | 11/2016 |
| WO | 2017073654 A1 | 5/2017 |
| WO | 2017160784 A1 | 9/2017 |
| WO | 2019031357 A1 | 2/2019 |

OTHER PUBLICATIONS

A First Office Action with Search Report issued by the State Intellectual Property Office of China on Aug. 1, 2024, for Chinese counterpart application No. 202180060364.7 (6 pages).

Extended European Search Report (EESR) dated Jul. 23, 2024, issued for European counterpart patent application No. EP21849236.1 (5 pages).

* cited by examiner

ACTIVE ENERGY RAY-CURABLE INKJET PRINTING INK COMPOSITION

CROSS-REFERENCE TO RELATED APPLICATIONS

This application is the U.S. National Phase under 35 U.S.C. § 371 of International Application PCT/JP2021/025776, filed Jul. 8, 2021, which claims priority to Japanese Patent Application No. JP2020-128740, filed Jul. 29, 2020. The International Application was published under PCT Article 21(2) in a language other than English.

TECHNICAL FIELD

The present invention relates to an active energy ray-curable inkjet printing ink composition suitable for printing on such base materials as sheets made of paper or resin including vinyl chloride-based polymers and ethylene-vinyl acetate-based copolymers, but especially on cardboard sheets and other paper, etc., as well as a printed matter obtained by using the same.

BACKGROUND ART

As described in Patent Literature 1, the problem of preventing the generation of curing wrinkles when photo-curable inkjet inks are cured, is public knowledge.

Also, inkjet ink compositions containing an amine-modified oligomer as well as an alkoxy group-containing monomer are public knowledge, as described in Patent Literature 2. However, these ink compositions do not satisfy requirements C and D, which are discussed later, under the present invention, for example.

Furthermore, the growing awareness of environmental conservation is highlighting the need to minimize waste by reexamining the materials for items of daily use, etc.

BACKGROUND ART LITERATURE

Patent Literature

Patent Literature 1: International Patent Laid-open No. 2007/074768
Patent Literature 2: International Patent Laid-open No. 2017/073654

SUMMARY OF THE INVENTION

Problems to be Solved by the Invention

An object of the present invention is to provide an active energy ray-curable inkjet printing ink composition that can demonstrate the effects of low viscosity, with its coating film generating no odor once cured while exhibiting excellent curability and no tackiness, and cured coating film demonstrating excellent bending tolerance property, abrasion resistance, and water resistance.

Means for Solving the Problems

After studying in earnest to achieve the aforementioned object, the inventors of the present invention found that a specific compositional makeup would achieve the aforementioned object, and completed the present invention.

To be specific, the present invention is described below.
1. An active energy ray-curable inkjet printing ink composition satisfying requirements (A) to (E) below:
   (A) the content of amine-modified oligomer is 1.0 to 20.0% by mass in the active energy ray-curable inkjet printing ink composition
   (B) alkoxy group-containing (meth)acrylate monomers are contained by 2.0 to 20.0% by mass in the active energy ray-curable inkjet printing ink composition
   (C) (meth)acrylate monomers having an alkyl group with 6 to 20 carbon atoms is contained by 2.0 to 25.0% by mass in the active energy ray-curable inkjet printing ink composition
   (D) at least one type selected from the group that consists of 1,6-hexanediol diacrylate, 3-methyl-1,5-pentanediol diacrylate, dipropylene glycol diacrylate, 1,10-decanediol diacrylate, propoxylated(2)neopentyl glycol diacrylate, and hydroxypivalic acid neopentyl glycol diacrylate is contained by 30.0 to 60.0% by mass in the active energy ray-curable inkjet printing ink composition
   (E) as photopolymerization initiators, ethoxy(2,4,6-trimethylbenzoyl)phenylphosphine oxide is contained by 3.0 to 15.0% by mass in the active energy ray-curable inkjet printing ink composition, and oligo(2-hydroxy-2-methyl-1-(4-(1-methylvinyl)phenyl)propanone) and/or 2-hydroxy-1-{4-[4-(2-hydroxy-2-methylpropionyl)phenoxy]phenyl}-2-methylpropanone is/are contained by 2.0 to 10.0% by mass in the active energy ray-curable inkjet printing ink composition, where the total content of photopolymerization initiators is 6.0 to 25.0% by mass in the active energy ray-curable inkjet printing ink composition
2. The active energy ray-curable inkjet printing ink composition according to 1, wherein at least some of the alkoxy group-containing (meth)acrylate monomers in (B) above are polyfunctional (meth)acrylate monomers and these polyfunctional (meth)acrylate monomers are contained by 5.0 to 20.0% by mass in the active energy ray-curable inkjet printing ink composition.
3. The active energy ray-curable inkjet printing ink composition according to 1 or 2, wherein one type of the (meth)acrylate monomers having an alkyl group with 6 to 20 carbon atoms is lauryl acrylate and/or stearyl acrylate.
4. The active energy ray-curable inkjet printing ink composition according to any one of 1 to 3, wherein one of the (meth)acrylate monomers having an alkyl group with 10 to 20 carbon atoms is lauryl acrylate synthesized using a plant-derived compound.
5. The active energy ray-curable inkjet printing ink composition according to any one of 1 to 4, wherein the 1,10-decanediol diacrylate is one synthesized using a plant-derived compound.
6. The active energy ray-curable inkjet printing ink composition according to any one of 1 to 5, wherein (F) a colorant is contained.

Effects of the Invention

The active energy ray-curable inkjet printing ink composition proposed by the present invention can demonstrate the effects of low viscosity, with its coating film generating no odor once cured while exhibiting excellent curability and no tackiness, and cured coating film demonstrating excellent bending tolerance property, abrasion resistance, and water resistance.

MODE FOR CARRYING OUT THE INVENTION

The active energy ray-curable inkjet printing ink composition proposed by the present invention, which satisfies requirements A to E above, is explained below in order.
<Requirement A>

Requirement A states that the content of amine-modified oligomer is 1.0 to 20.0% by mass in the active energy ray-curable inkjet printing ink composition. Among them, an acrylated amine compound having two photopolymerizable functional groups and two amino groups in a molecule is preferred.

Here, the acrylated amine compound having two photopolymerizable functional groups and two amino groups in a molecule is not limited. For example, the photopolymerizable functional groups in the acrylated amine compound may be functional groups that can form crosslinked bonds between molecules by undergoing polymerization reaction under visible light or invisible light such as ultraviolet ray, electron beam, or other ionizing radiation. Also, the photopolymerizable functional groups include both narrowly-defined photopolymerizable functional groups that are directly activated by irradiation of light to undergo photopolymerization reaction, and broadly-defined photopolymerizable functional groups whose polymerization reaction is initiated and promoted by the action of active species generated by photopolymerization initiators when light is irradiated on the photopolymerizable functional groups in the presence of the photopolymerization initiators.

The photopolymerizable functional groups are ethylenic double bonds, etc., having photoradical polymerization reactivity, or epoxy groups or other cyclic ether groups, etc., having photo-cationic polymerization or photo-anionic polymerization reactivity. Among these, the photopolymerizable functional groups are preferably ethylenic double bonds of (meth)acryloyl groups, vinyl groups, allyl groups, etc., or more preferably (meth)acryloyl groups.

Preferably the acrylated amine compound having two photopolymerizable functional groups and two amino groups in a molecule is such that the two photopolymerizable functional groups are both (meth)acryloyl groups and that its amine value is 130 to 142 KOHmg/g. It should be noted that this amine value represents the amine value per 1 gram of solids content, measured with a 0.1-N aqueous solution of hydrochloric acid according to the potentiometric titration method (using, for example, COMTITE (AUTO TITRATOR COM-900, BURET B-900, TITSTATION_K-900), manufactured by Hiranuma Sangyo Co., Ltd.) and then converted to an equivalent amount of potassium hydroxide.

Preferably the acrylated amine compound having two photopolymerizable functional groups and two amino groups in a molecule is an acrylated amine compound obtained by reacting a bifunctional (meth)acrylate with an amine compound.

The bifunctional (meth)acrylate is 1,4-butanediol di(meth)acrylate, 1,6-hexanediol di(meth)acrylate, 1,9-nonanediol di(meth)acrylate, propylene glycol di(meth)acrylate, 1,3-butylene glycol di(meth)acrylate, neopentyl glycol di(meth)acrylate, or other alkylene glycol di(meth)acrylate, di(meth)acrylate of ethylene oxide adduct of bisphenol A, di(meth)acrylate of ethylene oxide adduct of bisphenol F, di(meth)acrylate of ethylene oxide adduct of bisphenol S, di(meth)acrylate of ethylene oxide adduct of thiobisphenol, di(meth)acrylate of ethylene oxide adduct of brominated bisphenol A, or other bisphenol alkylene oxide adduct di(meth)acrylate, polyethylene glycol di(meth)acrylate, polypropylene glycol di(meth)acrylate, or other polyalkylene glycol di(meth)acrylate, or di(meth)acrylate of hydroxypivalic acid neopentyl glycol ester, for example. Of these, preferably the bifunctional (meth)acrylate is 1,6-hexanediol di(meth)acrylate.

The amine compound is benzylamine, phenethylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine, n-octadecylamine, or other monofunctional amine compound, diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthanediamine, bis(4-amino-3-methylcyclohexyl)methane, isophoronediamine, 1,3-diaminocyclohexane, spiro-acetal-based diamine, or other polyfunctional amine compound, for example. Also, the amine compound may be polyethyleneimine, polyvinylamine, polyallylamine, or other polyfunctional amine compound of high-molecular-weight type.

Preferably the acrylated amine compound having two photopolymerizable functional groups and two amino groups in a molecule is a compound obtained by reacting 1,6-hexanediol di(meth)acrylate with an amine compound. Specific examples include such acrylated amine compounds as CN371, CN373, CN383, and CN386 (manufactured by Sartomer Inc.) that are oligomers of acrylated amine compounds having two active energy ray-polymerizable functional groups and two amino groups in a molecule. Furthermore, EB7100 (EBECRYL 7100, manufactured by Cytec Industries, Inc.), AgiSyn_008 (manufactured by DSM company), etc., may also be used.

The content of amine-modified oligomer in the active energy ray-curable inkjet printing ink composition is 1.0% by mass or higher, or preferably 3.0% by mass or higher, or more preferably 4.0% by mass or higher, or yet more preferably 5.0% by mass or higher.

Also, the content of amine-modified oligomer in the active energy ray-curable inkjet printing ink composition is 20.0% by mass or lower, or preferably 15.0% by mass or lower, or more preferably 12.0% by mass or lower, or yet more preferably 9.0% by mass or lower.

If the content of amine-modified oligomer is under 1.0% by mass, the active energy ray-curable inkjet printing ink composition tends to have poor curability. If the content exceeds 20.0% by mass, on the other hand, the ink composition tends to have lower storage stability and discharge stability.

Also, the content of amine-modified oligomer relative to all photopolymerizable components in the active energy ray-curable inkjet printing ink composition is preferably 2.0% by mass or higher, or more preferably 3.0% by mass or higher, or yet more preferably 4.0% by mass or higher.

Also, the content of amine-modified oligomer relative to all photopolymerizable components in the active energy ray-curable inkjet printing ink composition is preferably 16.0% by mass or lower, or more preferably 10.0% by mass or lower, or yet more preferably 8.0% by mass or lower.
<Requirement B>

Requirement B states that alkoxy group-containing (meth)acrylate monomers are contained by 2.0 to 20.0% by mass among all polymerizable components in the active energy ray-curable inkjet printing ink composition.

The alkoxy group-containing (meth)acrylate monomers are not limited in any specific way. For example, these (meth)acrylate monomers may be various monofunctional (meth)acrylate monomers, bifunctional (meth)acrylate monomers, trifunctional (meth)acrylate monomers, or tetra-functional or higher-functional (meth)acrylate monomers, and the like, all generating very little odor. In consideration of the environment, (meth)acrylate monomers containing biomass-derived alkoxy groups may be used.

Specific examples include 2-methoxyethyl (meth)acrylate, 2-ethoxyethyl (meth)acrylate, 2-methoxybutyl (meth)acrylate, 2-(2-ethoxyethoxy)ethyl acrylate, 3-methoxybutyl (meth)acrylate, 2-butoxyethyl (meth)acrylate, and other monofunctional alkoxyalkyl (meth)acrylates, 2-butoxydiethylene glycol (meth)acrylate, methoxydiethylene glycol (meth)acrylate, methoxytriethylene glycol (meth)acrylate, ethoxydiethylene glycol (meth)acrylate, methoxydipropylene glycol (meth)acrylate, methoxytripropylene glycol (meth)acrylate, methoxypolyethylene glycol (meth)acrylate, octoxypolyethylene glycol-polypropylene glycol-mono(meth)acrylate, lauroxypolyethylene glycol mono(meth)acrylate, stearoxypolyethylene glycol mono(meth)acrylate, and other polyalkylene glycol structure-containing monofunctional alkoxy group-containing (meth)acrylates, and additionally, ethoxylated (3) trimethylolpropane tri(meth)acrylate, propoxylated(2)neopentyl glycol di(meth)acrylate, propoxylated(2)neopentyl glycol diacrylate, and other polyfunctional alkoxy group-containing (meth)acrylates may also be adopted.

Preferably, as the alkoxy group-containing (meth)acrylates constituting requirement B, the aforementioned alkoxy group-containing polyfunctional (meth)acrylates are contained by 30 to 100% by mass among the alkoxy group-containing (meth)acrylates under requirement B. Keeping the alkoxy group-containing polyfunctional (meth)acrylates within this range leads to excellent rub resistance.

The content of alkoxy group-containing (meth)acrylate monomers in the active energy ray-curable inkjet printing ink composition is preferably 5.0% by mass or higher, or more preferably 10.0% by mass or higher.

Also, the content of alkoxy group-containing (meth)acrylate monomers in the active energy ray-curable inkjet printing ink composition is preferably 18.0% by mass or lower, or more preferably 16.0% by mass or lower, or yet more preferably 14.0% by mass or lower.

If the content of alkoxy group-containing (meth)acrylate monomers in the active energy ray-curable inkjet printing ink composition is under 2.0% by mass, bending tolerance property will become poor, while a content exceeding 20.0% by mass will lead to poor water resistance.

In addition, the content of alkoxy group-containing (meth)acrylate monomers among all polymerizable components in the active energy ray-curable inkjet printing ink composition is preferably 6.0% by mass or higher, or more preferably 10.0% by mass or higher, or yet more preferably 12.0% by mass or higher. Also, it is preferably 20.0% by mass or lower, or more preferably 18.0% by mass or lower, or yet more preferably 16.0% by mass or lower.

<Requirement C>

Requirement C states that a (meth)acrylate having an alkyl group with 6 to 20 carbon atoms is contained by 2.0 to 25.0% by mass in the active energy ray-curable inkjet printing ink composition. The alkyl group with 6 to 20 carbon atoms can have any of straight-chain, branched, and alicyclic structures.

Here, the (meth)acrylate having an alkyl group with 6 to 20 carbon atoms is a monofunctional (meth)acrylate.

Examples include tridecyl (meth)acrylate, lauryl (meth)acrylate, stearyl (meth)acrylate, isoamyl (meth)acrylate, isodecyl (meth)acrylate, isotetradecyl (meth)acrylate, isobornyl (meth)acrylate, cyclohexyl (meth)acrylate, etc. Stearyl acrylate and lauryl acrylate are preferred.

The content of (meth)acrylate having an alkyl group with 6 to 20 carbon atoms in the active energy ray-curable inkjet printing ink composition is 2.0% by mass or higher, or preferably 5.0% by mass or higher, or more preferably 7.0% by mass or higher. Also, the content of (meth)acrylate having an alkyl group with 6 to 20 carbon atoms in the active energy ray-curable inkjet printing ink composition is 25.0% by mass or lower, or preferably 18.0% by mass or lower, or more preferably 15.0% by mass or lower.

If the content of (meth)acrylate having an alkyl group with 6 to 20 carbon atoms is under 2.0% by mass in the active energy ray-curable inkjet printing ink composition, bending tolerance property will become poor, while a content exceeding 25.0% by mass will lead to poor rub resistance.

The content of (meth)acrylate having an alkyl group with 6 to 20 carbon atoms among all polymerizable components in the active energy ray-curable inkjet printing ink composition is preferably 7.0% by mass or higher, or more preferably 9.0% by mass or higher, or yet more preferably 10.0% by mass or higher. Also, it is preferably 25.0% by mass or lower, or more preferably 22.0% by mass or lower, or yet more preferably 18.0% by mass or lower.

One of the materials constituting this (meth)acrylate having an alkyl group with 6 to 20 carbon atoms is a (meth)acrylic acid, and the other material is an alcohol with 6 to 20 carbon atoms. In addition, this alcohol can be obtained from a plant-derived material, for example, and has a recyclable carbon. This plant-derived material may be palm oil, palm kernel oil, coconut oil, or other plant material.

An alkyl group with 6 to 20 carbon atoms has a relatively large number of carbon atoms, the effect of which is that the more a (meth)acrylate containing such alkyl group is used as a material in the active energy ray-curable inkjet printing ink composition, the more biomass-derived carbon in the composition as a whole can be used.

<Requirement D>

Requirement D states that at least one type selected from the group that consists of 1,6-hexanediol diacrylate, 3-methyl-1,5-pentanediol diacrylate, dipropylene glycol diacrylate, 1,10-decanediol diacrylate, propoxylated(2)neopentyl glycol diacrylate, and hydroxypivalic acid neopentyl glycol diacrylate is used. The total content of the compounds in requirement D is 30.0 to 60.0% by mass in the active energy ray-curable inkjet printing ink composition.

It should be noted that, if the total amount of the compounds in requirement D is under 30.0% by mass, rub resistance will become poor, while a total amount exceeding 60.0% by mass will lead to poor bending tolerance property.

It should be noted that plant-derived materials may be adopted for these compounds.

<Requirement E>

Requirement E states that, as photopolymerization initiators, ethoxy(2,4,6-trimethylbenzoyl)phenylphosphine oxide is contained by 3.0 to 15.0% by mass in the active energy ray-curable inkjet printing ink composition, and oligo(2-hydroxy-2-methyl-1-(4-(1-methylvinyl)phenyl)propanone and/or 2-hydroxy-1-{4-[4-(2-hydroxy-2-methylpropionyl)phenoxy]phenyl}-2-methylpropanone is/are contained by 2.0 to 10.0% by mass in the active energy ray-curable inkjet printing ink composition, where the total content of photopolymerization initiators is 6.0 to 25.0% by mass in the active energy ray-curable inkjet printing ink composition.

Examples of the content of the photopolymerization initiators used under requirement E are that, if ultraviolet ray (UV) or ultraviolet ray (light-emitting diode (LED)) is used as the light source, the content of photopolymerization initiators is preferably 6.0% by mass or higher, or more preferably 8.0% by mass or higher, in the active energy ray-curable inkjet printing ink composition. Also, the content of photopolymerization initiators is preferably 25.0% by mass or lower, or more preferably 15.0% by mass or lower, in the active energy ray-curable inkjet printing ink composition. By keeping the content of photopolymerization initiators within the aforementioned range, the active energy ray-curable inkjet printing ink composition can have sufficient curability and internal curability while being low in cost.

To the extent that the effects of the present invention are not impaired, photopolymerization initiators other than those mentioned above may be contained in the active energy ray-curable inkjet printing ink composition proposed by the present invention. If should be noted that, if an electron beam is used as the active energy ray, photopolymerization initiators may or may not be contained.

The photopolymerization initiators that may be used include the following: Acylphosphine oxide-based polymerization initiators such as bis-2,6-dimethoxybenzoyl-2,4,4-trimethylpentylphosphine oxide, 2,4,6-trimethylbenzyl-diphenylphosphine oxide (TPO), bis(2,4,6-trimethylbenzoyl) phenylphosphine oxide, etc., as well as α-hydroxyketone-based polymerization initiators such as 2-hydroxy-1-{4-[4-(2-hydroxy-2-methyl-propionyl)-benzyl]-phenyl}-2-methyl-propane-1-one (Irgacure 127), 2-hydroxy-4'-hydroxyethoxy-2-methylpropiophenone (Irgacure 2959), 1-hydroxycyclohexyl phenyl ketone (Irgacure 184), 2-hydroxy-2-methyl-1-phenylpropane-1-one, 1-[4-(2-hydroxyethoxy)-phenyl]-2-hydroxy-2-methyl-1-propane-1-one, 1-hydroxycyclohexyl phenyl ketone, etc.

Others include benzophenone-based compounds (4,4'-diethylaminobenzophenone, etc.), thioxanthone-based compounds (2,4-diethylthioxanthone), 2-methyl-1-(4-methylthio)phenyl-2-morpholinopropane-1-one, 4'-(methylthio)-α-morpholino-α-methylpropiophenone, thiophenyl-based compounds (4-benzoyl-4'-methyldiphenyl sulfide), 1-chloro-4-propoxythioxanthone, isopropyl thioxanthone, 2,2-dimethyl-2-hydroxyacetophenone, 2,2-dimethoxy-2-phenylacetophenone, 2-benzyl-2-dimethylamino-1-(morpholinophenyl)-butane-1-one, [[4-benzoyl-4'-methyldiphenyl sulfide,]] ethyl Michler's ketone, polymer-type initiators (Omnipol TP, Omnipol BP), and 1-[4-(4-benzoylphenylsulfanyl)phenyl]-2-methyl-2-(4-methylphenylsulfonyl)propane-1-one (ESACURE 1001M).

These photopolymerization initiators are commercially available and can be obtained under the product names of Irgacure 907, Irgacure 369, Irgacure 184, Irgacure 379, Irgacure 819, TPO, etc., for example. Multiple photopolymerization initiators may be used together.

(Sensitizer)

In the active energy ray-curable inkjet printing ink composition proposed by the present invention, a photosensitizer (compound) that has light-absorbing properties primarily in the ultraviolet ray wavelength range of 400 nm and higher and manifests a function to sensitize the curing reaction under light having the wavelengths in this range, may also be used together with the polymerization initiators, to promote the curability under ultraviolet ray from a light-emitting diode (LED) light source. It should be noted that " . . . 400 nm and higher and manifests a function to sensitize . . . under light having the wavelengths in this range . . . " above means having light-absorbing properties in the wavelength range of 400 nm or higher. Use of such sensitizer can promote the LED curability of the ink composition in this embodiment.

Such sensitizer may be an anthracene-based sensitizer, thioxanthone-based sensitizer, etc., where a thioxanthone-based sensitizer is preferred. Any of these sensitizers may be used alone or two or more types may be used together.

Specific examples include 9,10-dibutoxyanthracene, 9,10-diethoxyanthracene, 9,10-dipropoxyanthracene, 9,10-bis(2-ethylhexyloxy)anthracene, and other anthracene-based sensitizers, as well as 2,4-diethyl thioxanthone, 2-isopropyl thioxanthone, 4-isopropyl thioxanthone, and other thioxanthone-based sensitizers. Representative examples of commercial products include DBA and DEA (manufactured by Kawasaki Kasei Chemicals Ltd.) for anthracene-based sensitizers, and DETX, ITX, CPTX (manufactured by Lambson Ltd.), and Omnipol TX (manufactured by IGM Resins Ltd.) for thioxanthone-based sensitizers, and the like.

Preferably the sensitizer content is in a range of 0 to 8.0% by mass relative to the total mass of active energy ray-polymerizable components. A content exceeding 8.0% by mass is not desirable because it represents an excessive addition that no longer leads to improvement in effects.

It should be noted that, if a thioxanthone-based sensitizer is used as the sensitizer, the active energy ray-curable inkjet printing ink composition tends to turn yellow and take on a hue that is yellower than the color based on the pigment, etc. (inherent hue), and therefore preferably the content of such thioxanthone-based sensitizer is determined as deemed appropriate for each color.

To be specific, preferably white ink compositions and clear ink compositions that are more easily affected by a change in color tone do not contain any thioxanthone compound as the sensitizer. Also, preferably magenta ink compositions and cyan ink compositions subject to problems of changing hue use it only to the extent that doing so does not cause problems with the hue. Also, preferably black ink compositions and yellow ink compositions use a thioxanthone-based compound as an additional sensitizer because their hue is not affected by a color change and their active energy-ray polymerizability is lower compared to ink compositions of other hues.

(Requirement G)

As requirement G that may be adopted, hydroxyl group-containing (meth)acrylate monomers are contained by 0 to 25.0% by mass among all polymerizable components in the active energy ray-curable inkjet printing ink composition.

In the ink, except when it is white, hydroxyl group-containing (meth)acrylate monomers can be contained by preferably 5.0 to 25.0% by mass, or more preferably 7.0 to 25.0% by mass, among all polymerizable components in the active energy ray-curable inkjet printing ink composition; however, hydroxyl group-containing (meth)acrylate monomers may or may not be contained in the active energy ray-curable inkjet printing ink composition.

If it is a white ink, preferably the active energy ray-curable inkjet printing ink composition does not contain hydroxyl group-containing (meth)acrylate monomers; however, hydroxyl group-containing (meth)acrylate monomers may be contained in the active energy ray-curable inkjet printing ink composition.

For the hydroxyl group-containing (meth)acrylate monomers, one or more types selected from the monomers below may be used:

2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 6-hydroxyhexyl (meth)acrylate, 8-hydroxyoctyl (meth)acrylate, and other hydroxyalkyl (meth)acrylates, diethylene glycol monoethyl ether (meth)acrylate and other polyethylene glycol mono(meth)acrylates, polypropylene glycol mono(meth)acrylate, 1,4-cyclohexanedimethanol mono(meth)acrylate, and other glycol mono(meth)acrylates, caprolactone-modified (meth)acrylate, hydroxyethyl acrylamide, EO (ethylene oxide)-modified succinic acid (meth)acrylate, etc., where hydroxyl group-containing (meth)acrylate monomers generating very little odor, such as 4-hydroxybutyl (meth)acrylate, are preferred.

<Requirement H>

As requirement H that may be adopted, a vinyl monomer may be contained. A vinyl monomer may be contained by 1.0 to 20.0% by mass among all polymerizable components in the active energy ray-curable inkjet printing ink composition. By containing a vinyl monomer, the active energy ray-curable inkjet printing ink composition will, when printed on a cardboard sheet, etc., and the cardboard sheet, etc., is bent, demonstrate better bending tolerance property.

It should be noted that vinyl monomers may or may not be contained in the active energy ray-curable inkjet printing ink composition.

The vinyl monomer is not limited in any specific way. For example, the vinyl monomer may be ethylene glycol divinyl ether, triethylene glycol divinyl ether, diethylene glycol divinyl ether, 1,4-cyclohexane dimethanol divinyl ether, ethylene glycol monovinyl ether, propylene glycol divinyl ether, dipropylene glycol divinyl ether, butanediol divinyl ether, hexanediol divinyl ether, trimethylolpropane trivinyl ether, etc.

Of these, preferably the vinyl monomer is triethylene glycol divinyl ether, etc., generating very little odor.

<Other Polymerizable Compounds>

Under the present invention, other polymerizable compounds besides the polymerizable components mentioned above may be contained to the extent that the performance will not drop, and the odor will be minimal.

It should be noted that, in the compounds listed below, "(poly)" before polyol terms indicates a condensation product of a mono-, or di- or higher polyols.

Benzyl (meth)acrylate, butyl (meth)acrylate, ethyl carbitol (meth)acrylate, caprolactone (meth)acrylate, methoxy tripropylene glycol (meth)acrylate, ethyl carbitol (meth)acrylate, phenoxyethyl (meth)acrylate, as well as acryloylmorpholine, acrylonitrile, acrylamide, diethylacrylamide, styrene, (meth)acrylate, urethane (meth)acrylate, epoxy (meth)acrylate, polyester (meth)acrylate, pentaerythritol ethoxy tetraacrylate, caprolactam-modified dipentaerythritol hexaacrylate, ethoxylated bisphenol A diacrylate, alkoxylated tetrahydrofurfuryl acrylate, dimethylol-tricyclodecane di(meth)acrylate, hydroxypivalic acid neopentyl glycol di(meth)acrylate, polytetramethylene glycol diacrylate, trimethylolpropane tri(meth)acrylate, and ethylene oxide-modified products thereof, pentaerythritol tri(meth)acrylate, etc;

(Alkylene Glycol Di(meth)acrylates)

Ethylene glycol di(meth)acrylate, diethylene glycol di(meth)acrylate, propylene glycol di(meth)acrylate, dipropylene glycol di(meth)acrylate, triethylene glycol di(meth)acrylate, tripropylene glycol di(meth)acrylate, and other (poly)alkylene glycol di(meth)acrylates, 1,4-butanediol di(meth)acrylate, 1,5-propanediol di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, polyethylene glycol di(meth)acrylate, and polypropylene glycol di(meth)acrylate; ((Poly)glycerin Poly(meth)acrylates)

Glycerin di(meth)acrylate, glycerin tetra(meth)acrylate, and diglycerin tetra(meth)acrylate;

((Poly)trimethylolpropane Poly(meth)acrylates)

Trimethylolpropane (meth)acrylate, trimethylolpropane di(meth)acrylate, trimethylolpropane tri(meth)acrylate, trimethylolpropane tetra(meth)acrylate, ditrimethylolpropane (meth)acrylate, ditrimethylolpropane di(meth)acrylate, ditrimethylolpropane tri(meth)acrylate, and ditrimethylolpropane tetra(meth)acrylate;

((Poly)pentaerythritol Poly(meth)acrylates)

Pentaerythritol tetra(meth)acrylate and ethylene oxide-modified products thereof, dipentaerythritol penta(meth)acrylate and ethylene oxide-modified products thereof, dipentaerythritol hexa(meth)acrylate and ethylene oxide-modified products thereof, tripentaerythritol hexa(meth)acrylate, tripentaerythritol hepta(meth)acrylate, tripentaerythritol octa(meth)acrylate, and dipentaerythritol hexa(meth)acrylate;

(Other Multivalent (Meth)acrylates)

As multivalent acrylates not encompassed in the foregoing, the following may be used:

Pentaerythritol tetracaprolactonate tetra(meth)acrylate, ditrimethylolpropane tetracaprolactonate tetra(meth)acrylate, ditrimethylolbutane tetra(meth)acrylate, ditrimethylolhexane tetra(meth)acrylate, ditrimethyloloctane tetra(meth)acrylate, tripentaerythritol polyalkylene oxide hepta(meth)acrylate, and other tetrafunctional or higher-functional monomers, etc., as well as hydroxypivalyl hydroxypivalate di(meth)acrylate, hydroxypivalyl hydroxypivalate dicaprolactonate di(meth)acrylate, etc.

It should be noted that 2-(2-vinyloxyethoxy)ethyl acrylate, 2-(allyloxymethyl)methyl acrylate, and amide group-containing monomers may or may not be contained.

To the extent that the performance of the active energy ray-curable inkjet printing ink composition proposed by the present invention does not drop, resins other than the aforementioned acrylic-based resins, such as vinyl chloride-based resin, vinyl chloride-vinyl acetate-based resin, ethylene-vinyl acetate-based resin, styrene-acrylic-based resin, styrene-maleic acid-based resin, rosin-based resin, rosin ester-based resin, petroleum resin, coumarone indene-based resin, terpene phenol-based resin, phenol resin, ketone resin, urethane resin, melamine resin, urea resin, epoxy-based resin, cellulose-based resin, xylene resin, alkyd resin, aliphatic hydrocarbon resin, butyral resin, maleic acid resin, fumaric acid resin, etc., may also be used together.

(Requirement F)

For the colorant contained in the active energy ray-curable inkjet printing ink composition proposed by the present invention, any known pigment or dye traditionally used in active energy ray-curable inkjet printing ink compositions may be used, where it is preferably an organic coloring pigment, inorganic coloring pigment, or other coloring pigment. Preferably the ink composition in this embodiment contains a colorant as requirement (I).

By containing a colorant, the ink composition can be made into an ink composition of each color.

Organic coloring pigments include dye lake pigments as well as azo-based, benzimidazolone-based, phthalocyanine-based, quinacridone-based, anthraquinone-based, dioxazine-based, indigo-based, thioindigo-based, perylene-based, perinone-based, diketopyrolopyrrole-based, isoindolinone-based, nitro-based, nitroso-based, flavanthrone-based, quinophthalone-based, pyranthrone-based, indanthrone-based pigments, and the like.

Inorganic coloring pigments include titanium oxide, red iron oxide, antimony red, cadmium yellow, cobalt blue, ultramarine blue, Prussian blue, iron black, chrome oxide green, carbon black, graphite, and other colored pigments (including coloring pigments of white, black, and other achromatic colors) as well as calcium carbonate, kaolin, clay, barium sulfate, aluminum hydroxide, talc, and other extender pigments, for example.

Specific examples of coloring pigments for the ink composition proposed by the present invention are listed below by representative hue.

Yellow pigments include C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., of which C. I. Pigment Yellow 150, 155, 180, 213, etc., are preferred.

Magenta pigments include C. I. Pigment Red 5, 7, 12, 19, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., of which C. I. Pigment Red 122, 202, C. I. Pigment Violet 19, etc., are preferred.

Cyan pigments include C. I. Pigment Blue 1, 2, 3, 15, 15:1, 15:2, 15:3, 15:4, 15:6, 16, 18, 22, 27, 29, 60, etc., of which C. I. Pigment Blue 15:4, etc., are preferred.

Black pigments include carbon black (C. I. Pigment Black 7), etc.

White pigments include titanium oxide, aluminum oxide, etc., of which titanium oxide whose surface is treated with alumina, silica, or any of various other materials is preferred, for example.

The content of colorant is preferably 1% by mass or higher in the ink composition. Also, the content of colorant is preferably 20% by mass or lower in the ink composition. When the content of colorant is within the aforementioned range, the ink composition will ensure proper image quality of printed matters obtained therewith, and also demonstrate excellent viscometric property.

(Pigment Dispersant)

The pigment dispersants that may be contained in the active energy ray-curable inkjet printing ink composition proposed by the present invention, when it contains a pigment, include ionic or nonionic surfactants, and anionic, cationic, or nonionic high-molecular compounds, for example.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 (manufactured by Ajinomoto Fine-Techno Co., Inc.) that are basic functional group-containing copolymers (both having acid and amine values of 10 to 20 mgKOH/g), SOLSPERSE 56000 (manufactured by The Lubrizol Corporation), SOLSPERSE 32000 (manufactured by The Lubrizol Corporation), SOLSPERSE 39000 (manufactured by The Lubrizol Corporation), DISPERBYK (manufactured by BYK-Chemie Japan K.K.), etc., are preferred. Any one type of these pigment dispersants may be used alone, or two or more types may be combined.

In particular, basic functional group-containing copolymers with an amine value of 10 to 40 mgKOH/g are preferred.

It should be noted that any of the aforementioned pigment dispersants may be selected and used as deemed appropriate according to the type of pigment and type of organic solvent used.

(Organic Solvent)

The active energy ray-curable inkjet printing ink composition proposed by the present invention may be of a so-called nonsolvent type in which all liquid components undergo curing reaction to be solidified, or of a solvent type in which the printed coating film is dried to remove solvent and then cured. It should be noted that water is not used as a solvent.

The following describes a case where the active energy ray-curable inkjet printing ink composition proposed by the present invention contains an organic solvent.

The organic solvents that may be contained in the active energy ray-curable inkjet printing ink composition proposed by the present invention include propylene carbonate, diethylene glycol dialkyl ether, dipropylene glycol alkyl ether acetate, etc.

For the diethylene glycol dialkyl ether, preferably diethylene glycol ethyl methyl ether and/or diethylene glycol diethyl ether is/are used, or any other diethylene glycol dialkyl ether may also be combined.

For the dipropylene glycol alkyl ether acetate, preferably one having an alkyl group with 6 or fewer carbon atoms, or more preferably one having an alkyl group with 3 or fewer carbon atoms, or yet more preferably one having an alkyl group with 2 or fewer carbon atoms, may be adopted.

Additionally, besides diethylene glycol dialkyl ether, an alkylene glycol derivative with a flash point of 50 to 150° C. may also be combined in order to adjust drying property and further improve anti-mottling property.

Examples of such alkylene glycol derivatives with a flash point of 50 to 150° C. include, for example, triethylene glycol dimethyl ether, triethylene glycol diethyl ether, tetraethylene glycol dimethyl ether, and other (poly) ethylene glycol dialkyl ethers, propylene glycol dimethyl ether, propylene glycol diethyl ether, dipropylene glycol dimethyl ether, dipropylene glycol diethyl ether, tetrapropylene glycol diethyl ether, tetrapropylene glycol dimethyl ether, and other (poly)propylene glycol dialkyl ethers, propylene glycol monobutyl ether, dipropylene glycol monomethyl ether, dipropylene glycol monoethyl ether, and other (poly)propylene glycol monoalkyl ethers, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoalkyl ethers, ethylene glycol monomethyl ether acetate, ethylene glycol monoethyl ether acetate, ethylene glycol monobutyl ether acetate, diethylene glycol monomethyl ether acetate, triethylene glycol monomethyl ether acetate, and other (poly)ethylene glycol monoalkyl ether monoalkyl esters, ethylene glycol diacetate, diethylene glycol diacetate, triethylene glycol diacetate, and other (poly)ethylene glycol diesters, ethylene glycol monomethyl ether acetate, diethylene glycol monoethyl ether acetate, diethylene glycol monobutyl ether acetate, diethylene glycol monopropyl ether acetate, triethylene glycol monomethyl ether acetate, triethylene glycol monoethyl ether acetate, triethylene glycol monobutyl ether acetate, and other (poly)ethylene glycol monoether monoesters.

Among the alkylene glycol derivatives with a flash point of 50 to 150° C., diethylene glycol ethyl methyl ether and diethylene glycol diethyl ether are called to attention first.

Also, to the extent that it does not significantly change the flash point of the solvent as a whole, ethylene glycol diethyl ether, ethylene glycol dimethyl ether, propylene glycol monomethyl ether, propylene glycol monoethyl ether, propylene glycol monomethyl ether acetate, etc., whose flash point is not in a range of 50 to 150° C. may also be combined.

(Other Components)

Furthermore, in the active energy ray-curable inkjet printing ink composition proposed by the present invention, various additives such as surfactants, plasticizers, polymerization inhibitors, surface conditioners, ultraviolet protective agents, photostabilizers, and antioxidants may be used as necessary.

(Viscosity of Active Energy Ray-curable Inkjet Printing Ink Composition)

Preferably the active energy ray-curable inkjet printing ink composition proposed by the present invention has a viscosity of 30.0 mPa·s or lower at 25° C. If the viscosity exceeds 30.0 mPa·s, discharging of the ink composition from inkjet printing nozzles may become difficult.

It should be noted that this viscosity represents viscosity measured under the conditions of 25° C. and 20 rpm using a type-E viscometer (product name: RE100L Viscometer, manufactured by Toki Sangyo Co., Ltd.).

(Manufacturing of Active Energy Ray-curable Inkjet Printing Ink Composition)

Next, how the active energy ray-curable inkjet printing ink composition proposed by the present invention is manufactured using these materials is explained.

The active energy ray-curable inkjet printing ink composition proposed by the present invention can be obtained by dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill, or other dispersion machine, for example, and adjusting the viscosity of the active energy ray-curable inkjet printing ink composition to between 2 and 10 mPa·s.

Preferably the content of all organic solvents in the active energy ray-curable inkjet printing ink composition proposed by the present invention, which is the total amount of ink composition less the total sum of the amounts of solids content as well as other additives used as necessary, is changed as deemed appropriate so as to bring the ink viscosity into the aforementioned range.

The thus obtained active energy ray-curable inkjet printing ink composition proposed by the present invention can be used with inkjet printers on printing paper, cardboard paper, and other paper base materials.

(Method for Manufacturing Printed Matter)

Next, how a printed matter is manufactured using the active energy ray-curable inkjet printing ink composition proposed by the present invention is explained.

This manufacturing method includes a step to print the aforementioned active energy ray-curable inkjet printing ink composition on a base material according to the inkjet method.

The base material is not limited in any specific way. For example, the base material may be one constituted by various resins or by paper, capsules, gel, metal foil, glass, wood, fabric, etc., but particularly a cardboard sheet or other paper. The ink composition in this embodiment demonstrates excellent bending tolerance property even when the base material on which it has been printed is bent. This makes it particularly favorable to use the ink composition when the base material is a cardboard sheet or other base material used in bending applications.

If the base material is a cardboard sheet of C-liner or K-liner type or the like, the ink composition may be added directly on the cardboard sheet, or it may be added after providing a precoat layer (primer layer) on the cardboard sheet or giving it corona discharge treatment, etc. This is mentioned because used paper, recycled paper, etc., are utilized for cardboard sheets in recent years in consideration of the environment. When using a K-liner cardboard sheet, the coarse irregularity, dull color, and high permeability of printed inks, of/into its surface require attention. This is why printing the ink composition on such cardboard sheet will likely cause a drop in printing quality due to the brown color of the liner body paper constituting the substrate.

Particularly when the color of the substrate shows through in the printed areas, the inkjet images will appear muddy, and attractiveness of the printed matter will be affected. To rid such cardboard sheet of the aforementioned irregularity, etc., a precoat layer is provided as deemed appropriate.

A precoat layer is provided for the purpose of, for example, adjusting the whiteness, color tone, etc., of the liner body paper constituting the cardboard sheet and thereby increasing the whiteness of the substrate. A precoat layer can be formed by applying a precoat agent containing a pigment and an adhesive.

The pigment is not limited in any specific way. For example, the pigment may be titanium dioxide (anatase, rutile) or aluminum hydroxide, barium sulfate, calcium carbonate, amorphous silica, clay, or other extender pigment. Also, the content of white pigment is preferably 20 to 85 parts by mass, or more preferably 20 to 80 parts by mass, per 100 parts by mass of precoat agent.

Preferably the binder resin used in the precoat layer on the cardboard is an aqueous resin. Preferably the aqueous resin is a natural resin, synthetic resin, etc., where a starch derivative, casein, shellac, polyvinyl alcohol derivative, acrylic-based or maleic acid-based resin, etc., is more preferred. To be more specific, an aqueous acrylic-based resin copolymerized with an acrylic acid or methacrylic acid or alkyl ester thereof, or styrene, etc., as primary monomer components, aqueous styrene-acrylic resin, aqueous styrene-maleic acid resin, aqueous styrene-acrylic acid-maleic acid resin, aqueous polyurethane resin, aqueous polyester resin, etc., may be used favorably as the aqueous resin. The content of binder resin is preferably 1 to 25 parts by mass, or more preferably 1 to 15 parts by mass, relative to 100 parts by mass of precoat agent.

The aqueous media that may be used in the precoat layer (primer layer) include water and mixtures of water with water-miscible solvents. Water-miscible solvents are lower alcohols, polyalcohols, and alkyl ethers or alkyl esters thereof, for example. To be specific, water-miscible solvents include methyl alcohol, ethyl alcohol, normal propyl alcohol, isopropyl alcohol, and other lower alcohols, ethylene glycol, propylene glycol, diethylene glycol, dipropylene glycol, glycerin, and other polyalcohols, ethylene glycol monomethyl ether, ethylene glycol monoethyl ether, ethylene glycol monoacetate, propylene glycol monomethyl ether, propylene glycol monoethyl ether, propylene glycol monoacetate, diethylene glycol monomethyl ether, dipropylene glycol monomethyl ether, etc.

If necessary, film forming agents, pigment dispersants or pigment dispersing resins, anti-blocking agents, humectants, viscosity adjusting agents, pH adjusting agents, defoaming agents, general surfactants, and various other additives may be selected and used in the precoat layer as deemed appropriate besides the components mentioned above.

How the precoat agent is manufactured using these various materials is not limited in any specific way. One example of the method for manufacturing the precoat agent is a general method whereby white pigment, aqueous binder resin, water, water-miscible solvent, if necessary, and pigment dispersant or pigment dispersing resin, are mixed and kneaded together, to which additives, water, water-miscible solvent, if necessary, and the remainder of the specified materials, are added and mixed.

It should be noted that the precoat agent can be obtained more easily by adding together the necessary quantities of the aforementioned components and then mixing and dispersing the components using a homo mixer, lab mixer, or other high-speed mixer, or triple-roll mill, bead mill, or other disperser.

If a primer layer is provided, the thickness of the primer layer (application quantity of the precoat agent) is not limited in any specific way. For the primer layer, preferably the application quantity of solids content is in a range of 0.1 to 5 g/m². Keeping the thickness of the primer layer (application quantity of the precoat agent) within the aforementioned range facilitates the adjustment of the whiteness and color tone of the cardboard sheet to appropriate levels.

The method for printing and curing the active energy ray-curable inkjet printing ink composition proposed by the present invention may specifically be a method whereby the active energy ray-curable inkjet printing ink composition proposed by the present invention is discharged onto a base material from an inkjet head, after which the coating film of the ink composition proposed by the present invention that has landed on the base material is exposed to light and thereby cured.

For example, the discharge onto the base material (printing of images) may be implemented by supplying the active energy ray-curable inkjet printing ink composition proposed by the present invention to the low-viscosity-compatible printer head of an inkjet recording printer, and then discharging the ink composition from the printer head in such a way that the coating film on the base material will have a film thickness of 1 to 60 μm, for example. Also, the exposure to light and curing (curing of images) may be implemented by irradiating an active energy ray onto the coating film of the active energy ray-curable inkjet printing ink composition proposed by the present invention that has been applied on the base material as images.

For the inkjet recording printer device with which to print the active energy ray-curable inkjet printing ink composition proposed by the present invention, any traditionally-used inkjet recording printer device may be utilized. It should be noted that, if a continuous-type inkjet recording printer device is used, a conductivity-adding agent is further added to the active energy ray-curable inkjet printing ink composition proposed by the present invention to adjust its conductivity.

The source of active energy ray in the aforementioned curing of the coating film may be ultraviolet ray (UV lamp), ultraviolet ray (light-emitting diode (LED)), electron beam, visible light, etc. As for the device, specifically one or more types selected from the group that consists of ultrahigh-pressure mercury lamp, high-pressure mercury lamp, low-pressure mercury lamp, mercury xenon lamp, metal halide lamp, high-power metal halide lamp, xenon lamp, pulsed-emission xenon lamp, deuterium lamp, fluorescent light, Nd-YAG third-harmonic laser, He—Cd laser, nitrogen laser, Xe—Cl excimer laser, Xe—F excimer laser, diode-pumped solid-state laser, LED lamp, etc., may be used. Preferably a light-emitting diode (LED) generating an ultraviolet ray of 350 to 420 nm in emission peak wavelength is used in consideration of the environment.

It should be noted that an ultraviolet ray from a light-emitting diode (LED) light source refers to a "ray irradiated from a light-emitting diode that generates an ultraviolet ray with an emission peak wavelength in a range of 350 to 420 nm."

It should be noted that the temperature of the ink composition at the time of printing may be room temperature of around 20 to 26° C., or it may be other temperatures.

EXAMPLES

The present invention is explained in greater detail below by citing examples, but the present invention is not limited to these examples. It should be noted that, unless otherwise specified, "%" and "part" refer to "% by mass" and "part by mass," respectively.

The materials used in the following Examples and Comparative Examples are listed below. In the Tables, the unit of values in the fields relating to pigments, dispersants, resins, solvents, and totals is "% by mass."

(Pigments)

P. B. 15:4(Pigment Blue 15:4)

Titanium oxide (Photopolymerizable Compound)

CN371 (manufactured by Sartomer Inc.) (amine-modified oligomer)

EOTMPTA: Ethoxy trimethylolpropane triacrylate (alkoxy group-containing photopolymerizable compound)

TDC-a 14,AMD
HDDA: 1,6-hexanediol diacrylate
LA: Lauryl acrylate
STA: Stearyl acrylate
4HBA: 4-hydroxybutyl acrylate
(Photopolymerization Initiators)
  TPO: 2,4,6-trimethylbenzoyl-diphenyl-phosphine oxide
  Irgacure 819: Bis(2,4,6-trimethylbenzoyl)phenylphosphine oxide
  TPOL: Ethoxy(2,4,6-trimethylbenzoyl)phenylphosphine oxide
  ESACURE ONE: Oligo{2-hydroxy-2-methyl-1-[4-(1-methylvinyl)phenyl]propanone}
  KIP 160: 2-hydroxy-1-{4-[4-(2-hydroxy-2-methylpropionyl)phenoxy]phenyl}-2-methylpropanone
(Sensitizers)
  DETX: Diethylthioxanthone (manufactured by Lambson Ltd.)
  TX1: Omnipol TX (manufactured by IGM Resins Ltd.)
(Polymerization Inhibitor)
  UV-5
(Surface Conditioner)
  BYK-331: Silicone-based surfactant
(Pigment Dispersant)
  PB822 (manufactured by Ajinomoto Fine-Techno Co., Inc.)

Examples 1 to 12, Comparative Examples 1 to 8

<Manufacturing of Active Energy Ray-curable Inkjet Printing Ink Compositions>
The active energy ray-curable inkjet printing ink compositions in the Examples and Comparative Examples were obtained according to the formulations in Table 1.
<Cardboard Base Materials>
  K-liner, C-liner
<Precoat Agent>
45 parts by mass of calcium carbonate with an average particle size of 0.05 μm, 25 parts by mass of styrene-maleic acid resin with an acid value of 170 mgKOH/g (solids content 25%), and 30 parts by mass of water, were dispersed in a bead mill, to obtain a 45% slurry of calcium carbonate. 80 parts by mass of the 45% slurry of calcium carbonate and 20 parts by mass of styrene-maleic acid resin with an acid value of 170 mgKOH/g (solids content 25%) were mixed under agitation to obtain a precoat agent.
<Application of Precoat Agent on K-liner>
The precoat agent prepared above was applied on a K-liner using a 0.1-mm Meyer bar until the application quantity reached approx. 4 g/m². Next, the precoat agent-applied surface was dried with hot air.
<Evaluation Methods and Evaluation Criteria>
The evaluation criteria for the items shown in Table 1 are as follows.
(Viscosity)
The active energy ray-curable inkjet printing ink compositions obtained in the Examples and Comparative Examples were measured for viscosity using a type-E viscometer (product name: RE100L Viscometer, manufactured by Toki Sangyo Co., Ltd.) under the conditions of 25° C. in temperature and 20 rpm in rotating speed.
(Odor of Coating Film) A coating film was formed on the base material to a coating film size of 8 cm×12 cm and cured, after which the base material was put in a zipper bag of 24 cm×34 cm and the odor in the bag was checked 1 hour later. 10 subjects were asked to smell the bag and evaluate on the scale of 1 to 5 below. The table shows the average scores of 10 subjects rounded to the nearest integer:
  5: No odor
  4: Low odor
  3: Moderate odor
  2: Strong odor
  1: Intense odor
(Curability)
An inkjet recording device and each active energy ray-curable inkjet printing ink composition were let stand for 24 hours at an ambient temperature of 25° C., to bring the temperatures of the inkjet recording device and the active energy ray-curable inkjet printing ink composition to 25° C. Thereafter, at 25° C., precoated K- and C-liners were continuously printed on (printing characters) using the active energy ray-curable inkjet printing ink composition, after which the ink composition was cured using a UV-LED lamp manufactured by Phoseon Technology with the distance between the lamp and the ink application surface adjusted to 2 cm, until the cumulative UV ray quantity reached 180 mJ/cm². The obtained cured coating film was rubbed with a cotton swab and curability was evaluated by how much of the coating film was removed according to the evaluation criteria below:
  O: Removal is not observed.
  Δ: Slight removal is observed.
  X: Removal is observed.
(Tackiness)
An inkjet printing (recording) device equipped with an inkjet nozzle for low-viscosity inks, and each ink composition, were let stand for 24 hours at an ambient temperature of 25° C., to bring the temperatures of the inkjet printing device and each ink composition to 25° C. Thereafter, at 25° C., each ink composition was continuously printed on PVC80 (vinyl chloride resin sheet (12 cm×18 cm) manufactured by Lintec Corporation), and then cured using a UV-LED lamp manufactured by Phoseon Technology with the distance between the lamp and the ink application surface adjusted to 2 cm, until the cumulative UV ray quantity reached 180 J/cm². The surface of the resulting coating film was touched with a finger and the subsequent state of the coating film was visually checked to evaluate tackiness according to the evaluation criteria below:
  O: No fingerprint is left on the coating film.
  Δ: A slight fingerprint is left on the coating film.
  X: A fingerprint is left on the coating film.
(Bending Tolerance Property)
Each ink composition was printed on precoated K- and C-liners and the liners were bent by 90 degrees with their printed surface facing outward (so that areas of the non-printed back side of the K-liner/C-liner would face each other), to evaluate bending tolerance property according to the evaluation criteria below:
  O: When bent, the coating film generates no line cracks or microcracks.
  Δ: When bent, the coating film generates microcracks.
  X: When bent, the coating film generates line cracks.
(Abrasion Resistance)
Using a Gakushin-type rubbing tester (manufactured by Daiei Kagaku Seiki Mfg. Co., Ltd.), each cured film obtained in the aforementioned evaluation of curability was rubbed 200 times with a water-moistened bleached cloth under a load of 500 g, to visually observe how much of the cured film is removed from the precoated K-liner/C-liner and evaluate abrasion resistance according to the evaluation criteria below:

O: The cured film is not removed.
A: Scratch marks are left on the cured film.
X: The cured film is removed, and the sheet becomes visible.

(Water Resistance)

Using a Gakushin-type rubbing tester (manufactured by Daiei Kagaku Seiki Mfg. Co., Ltd.), each cured film obtained in the aforementioned evaluation of curability was rubbed 30 times with a water-moistened bleached cloth under a load of 500 g, to visually observe how much of the cured film is removed from the precoated K-liner/C-liner and evaluate water resistance according to the evaluation criteria below:

O: The cured film is not removed.
Δ: Scratch marks are left on the cured film.
X: The cured film is removed, and the sheet becomes visible.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Photopolymerizable compounds | CN371 | 6.00 | 6.00 | 6.00 | 6.00 | 6.00 | 6.00 | 2.00 | 13.00 | 6.00 | 6.00 |
| | EOTMPTA | 8.00 | 8.00 | 8.00 | 8.00 | 8.00 | 8.00 | 8.00 | 8.00 | 8.00 | 8.00 |
| | HDDA | 11.00 | 9.50 | 11.00 | 11.00 | 11.00 | 41.00 | 10.00 | 11.00 | | |
| | Propoxylated(2)neopentyl glycol diacrylate | 5.00 | 5.00 | 5.00 | 5.00 | 5.00 | 5.00 | 5.00 | 5.00 | 16.00 | 5.00 |
| | Hydroxypivalic acid neopentyl glycol diacrylate | | | | | | | | | | 11.00 |
| | Vegetable oil-derived 1,10-decanediol diacrylate | 30.00 | 30.00 | 30.00 | 30.00 | 29.50 | | 28.00 | 27.50 | 30.00 | 30.00 |
| | Vegetable oil-derived LA | 9.00 | 9.00 | 9.00 | | 9.00 | 9.00 | 8.00 | 8.00 | 9.00 | 9.00 |
| | STA | | | | 12.00 | | | | | | |
| | 4HBA | 16.40 | 16.40 | 16.40 | 13.40 | 16.40 | 16.40 | 14.40 | 14.40 | 16.40 | 16.40 |
| Photopolymerization initiators | TPO | | 3.00 | | | | | | | | |
| | Irgacure 819 | 3.00 | 1.50 | 3.00 | 3.00 | 3.00 | 3.00 | 4.80 | 2.50 | 3.00 | 3.00 |
| | TPOL | 3.50 | 3.50 | 3.50 | 3.50 | 3.50 | 3.50 | 10.00 | 3.00 | 3.50 | 3.50 |
| | ESACURE ONE | 3.00 | 3.00 | | 3.00 | 3.00 | 3.00 | 4.70 | 2.50 | 3.00 | 3.00 |
| | KIP 160 | | | 3.00 | | | | | | | |
| Sensitizers | DETX | 0.50 | 0.50 | 0.50 | 0.50 | | 0.50 | 0.50 | 0.50 | 0.50 | 0.50 |
| | TX1 | | | | | 1.00 | | | | | |
| Polymerization inhibitor | UV-5 | 2.00 | 2.00 | 2.00 | 2.00 | 2.00 | 2.00 | 2.00 | 2.00 | 2.00 | 2.00 |
| Surface conditioner | BYK-331 | 0.50 | 0.50 | 0.50 | 0.50 | 0.50 | 0.50 | 0.50 | 0.50 | 0.50 | 0.50 |
| Pigments | P.B. 15:4 | 1.60 | 1.60 | 1.60 | 1.60 | 1.60 | 1.60 | 1.60 | 1.60 | 1.60 | 1.60 |
| | Titanium oxide | | | | | | | | | | |
| Pigment dispersant | PB822 | 0.50 | 0.50 | 0.50 | 0.50 | 0.50 | 0.50 | 0.50 | 0.50 | 0.50 | 0.50 |
| Total | | | | | | 100.00 | | | | | |
| Viscosity (mPa·s) | | 20.0 | 21.0 | 20.5 | 21.0 | 20.5 | 16.0 | 22.0 | 22.5 | 21.5 | 22.5 |
| Odor of coating film | | 5 | 5 | 5 | 5 | 5 | 5 | 5 | 5 | 5 | 5 |
| Curability | | O | O | O | O | O | O | O | O | O | O |
| Tackiness | | O | O | O | O | O | O | O | O | O | O |
| Bending tolerance property | | O | O | O | O | O | O | O | O | O | O |
| Abrasion resistance | | O | O | O | O | O | O | O | O | O | O |
| Water resistance | | O | O | O | O | O | O | O | O | O | O |

| | | Examples | | Comparative Examples | | | | | | | |
|---|---|---|---|---|---|---|---|---|---|---|---|
| | | 11 | 12 | 1 | 2 | 3 | 4 | 5 | 6 | 7 | 8 |
| Photopolymerizable compounds | CN371 | 10.00 | 8.00 | 6.00 | 6.00 | 6.00 | | 6.00 | 6.00 | 6.00 | 6.00 |
| | EOTMPTA | 8.00 | 15.00 | 8.00 | 8.00 | 8.00 | 8.00 | 13.00 | 8.00 | 4.00 | 8.00 |
| | HDDA | 22.40 | | 14.00 | 10.00 | 14.00 | 14.50 | 8.00 | 11.00 | 25.00 | 11.00 |
| | Propoxylated(2)neopentyl glycol diacrylate | | | 5.00 | 5.00 | 5.00 | 5.00 | 13.00 | 10.00 | 5.00 | 5.00 |
| | Hydroxypivalic acid neopentyl glycol diacrylate | | | | | | | | | | |
| | Vegetable oil-derived 1,10-decanediol diacrylate | 15.00 | 35.00 | 30.00 | 23.00 | 30.50 | 30.00 | 8.00 | 30.00 | 32.00 | 18.00 |
| | Vegetable oil-derived LA | 15.00 | 5.50 | 9.00 | 8.00 | 9.00 | 9.00 | 13.00 | | 7.00 | 27.00 |
| | STA | | | | | | | 5.00 | | | |
| | 4HBA | | 24.60 | 16.40 | 13.90 | 16.40 | 16.40 | 19.40 | 20.40 | 6.40 | 10.40 |

TABLE 1-continued

| | | | | | | | | | | | |
|---|---|---|---|---|---|---|---|---|---|---|---|
| Photopolymerization initiators | TPO | | | | | | | | | | |
| | Irgacure 819 | | | 3.00 | 5.00 | 1.00 | 4.00 | 3.00 | 3.00 | 3.00 | 3.00 |
| | TPOL | 8.00 | 5.00 | 3.50 | 16.00 | 2.00 | 4.00 | 3.50 | 3.50 | 3.50 | 3.50 |
| | ESACURE ONE | 3.50 | 6.00 | | | 3.00 | 4.00 | 3.00 | 3.00 | 3.00 | |
| | KIP 160 | | | | | | | | | | 3.00 |
| Sensitizers | DETX | | | 0.50 | 0.50 | 0.50 | 0.50 | 0.50 | 0.50 | 0.50 | 0.50 |
| | TX1 | | | | | | | | | | |
| Polymerization inhibitor | UV-5 | | 0.40 | 2.00 | 2.00 | 2.00 | 2.00 | 2.00 | 2.00 | 2.00 | 2.00 |
| Surface conditioner | BYK-331 | 0.50 | 0.50 | 0.50 | 0.50 | 0.50 | 0.50 | 0.50 | 0.50 | 0.50 | 0.50 |
| Pigments | P.B. 15:4 | | | 1.60 | 1.60 | 1.60 | 1.60 | 1.60 | 1.60 | 1.60 | 1.60 |
| | Titanium oxide | 16.00 | | | | | | | | | |
| Pigment dispersant | PB822 | 1.60 | | 0.50 | 0.50 | 0.50 | 0.50 | 0.50 | 0.50 | 0.50 | 0.50 |
| | Total | | | | | 100.00 | | | | | |
| | Viscosity (mPa · s) | 21.0 | 20.5 | 18.0 | 25.0 | 18.0 | 19.5 | 19.5 | 24.0 | 22.0 | 15.5 |
| | Odor of coating film | 5 | 5 | 3 | 5 | 3 | 3 | 3 | 5 | 4 | 2 |
| | Curability | ○ | ○ | × | ○ | × | △ | △ | ○ | △ | △ |
| | Tackiness | ○ | ○ | × | △ | × | × | × | ○ | △ | × |
| | Bending tolerance property | ○ | ○ | ○ | ○ | ○ | × | ○ | × | × | ○ |
| | Abrasion resistance | ○ | ○ | × | △ | × | △ | × | ○ | △ | △ |
| | Water resistance | ○ | ○ | △ | ○ | △ | ○ | × | ○ | ○ | ○ |

According to the Examples that represent examples conforming to the present invention, active energy ray-curable inkjet printing ink compositions were obtained that are characterized by the ink composition having low viscosity, with its coating film generating no odor while exhibiting excellent curability, and the cured coating film presenting no tackiness while demonstrating excellent bending tolerance property, rub resistance, and water resistance.

By contrast, Comparative Example 1 containing neither ESACURE ONE nor KIP 160 produced a coating film that had odor and was poor in curability, tackiness, adhesion on some base materials, abrasion resistance, and water resistance, while Comparative Example 2 also free of ESACURE ONE and KIP 160 and characterized by a higher total content of Irgacure 819 and TPOL resulted in poor tackiness and abrasion resistance.

Also, Comparative Example 3 characterized by a lower total content of TPOL produced a coating film that had odor and exhibited poor curability, tackiness, abrasion resistance, and water resistance, Comparative Example 4 containing no amine-modified oligomer produced a coating film that had odor and exhibited poor curability, tackiness, bending tolerance property, and abrasion resistance, and Comparative Example 5 characterized by a lower content of the compounds in requirement D produced a coating film that had odor and exhibited poor curability, tackiness, abrasion resistance, and water resistance.

Furthermore, Comparative Example 6 containing neither the compound in requirement C nor any (meth)acrylate monomer having an alkyl group with 6 to 20 carbon atoms resulted in poor bending tolerance property, Comparative Example 7 containing an excessive amount of the components in requirement D produced a coating film that had odor and exhibited poor curability, tackiness, bending tolerance property, and abrasion resistance, and Comparative Example 8 containing an excessive amount of the compound in requirement C produced a coating film that had odor and exhibited poor curability, tackiness, and abrasion resistance.

What is claimed is:

1. An active energy ray-curable inkjet printing ink composition satisfying requirements A to E below:
   (A) a content of amine-modified oligomer is 1.0 to 20.0% by mass in the active energy ray-curable inkjet printing ink composition;
   (B) alkoxy group-containing (meth)acrylate monomers are contained by 2.0 to 20.0% by mass in the active energy ray-curable inkjet printing ink composition;
   (C) (meth)acrylate monomers having an alkyl group with 6 to 20 carbon atoms are contained by 2.0 to 25.0% by mass in the active energy ray-curable inkjet printing ink composition;
   (D) at least one compound selected from a group that consists of 1,6-hexanediol diacrylate, 3-methyl-1,5-pentanediol diacrylate, dipropylene glycol diacrylate, 1,10-decanediol diacrylate, propoxylated(2)neopentyl glycol diacrylate, and hydroxypivalic acid neopentyl glycol diacrylate is contained by 30.0 to 60.0% by mass in the active energy ray-curable inkjet printing ink composition;
   (E) as photopolymerization initiators, ethoxy(2,4,6-trimethylbenzoyl)phenylphosphine oxide is contained by 3.0 to 15.0% by mass in the active energy ray-curable inkjet printing ink composition, and oligo(2-hydroxy-2-methyl-1-(4-(1-methylvinyl)phenyl)propanone) and/or 2-hydroxy-1-{4-[4-(2-hydroxy-2-methylpropionyl)phenoxy]phenyl}-2-methylpropanone is/are contained by 2.0 to 10.0% by mass in the active energy ray-curable inkjet printing ink composition, where a total content of photopolymerization initiators is 6.0 to 25.0% by mass in the active energy ray-curable inkjet printing ink composition.

2. The active energy ray-curable inkjet printing ink composition according to claim 1, wherein at least some of the alkoxy group-containing (meth)acrylate monomers in (B) above are polyfunctional (meth)acrylate monomers and these polyfunctional (meth)acrylate monomers are contained by 5.0 to 20.0% by mass in the active energy ray-curable inkjet printing ink composition.

3. The active energy ray-curable inkjet printing ink composition according to claim 1, wherein one of the (meth)acrylate monomers in (C) having an alkyl group with 6 to 20 carbon atoms is lauryl acrylate and/or stearyl acrylate.

4. The active energy ray-curable inkjet printing ink composition according to claim 1, wherein one of the (meth)acrylate monomers in (C) having an alkyl group with 6 to 20 carbon atoms is lauryl acrylate synthesized using a plant-derived compound.

5. The active energy ray-curable inkjet printing ink composition according to claim 1, wherein the 1,10-decanediol diacrylate is selected in (D), wherein the 1,10-decanediol diacrylate is one synthesized using a plant-derived compound.

6. The active energy ray-curable inkjet printing ink composition according to claim 1, further satisfying the following:

(F) a colorant is contained.

7. The active energy ray-curable inkjet printing ink composition according to claim 2, wherein one of the (meth) acrylate monomers in (C) having an alkyl group with 6 to 20 carbon atoms is lauryl acrylate and/or stearyl acrylate.

8. The active energy ray-curable inkjet printing ink composition according to claim 2, wherein one of the (meth) acrylate monomers in (C) having an alkyl group with 6 to 20 carbon atoms is lauryl acrylate synthesized using a plant-derived compound.

9. The active energy ray-curable inkjet printing ink composition according to claim 2, wherein the 1,10-decanediol diacrylate is selected in (D), wherein the 1,10-decanediol diacrylate is one synthesized using a plant-derived compound.

10. The active energy ray-curable inkjet printing ink composition according to claim 2, further satisfying the following:

(F) a colorant is contained.

11. The active energy ray-curable inkjet printing ink composition according to claim 3, wherein one of the (meth)acrylate monomers in (C) having an alkyl group with 6 to 20 carbon atoms is lauryl acrylate synthesized using a plant-derived compound.

12. The active energy ray-curable inkjet printing ink composition according to claim 3, wherein the 1,10-decanediol diacrylate is selected in (D), wherein the 1,10-decanediol diacrylate is one synthesized using a plant-derived compound.

13. The active energy ray-curable inkjet printing ink composition according to claim 3, further satisfying the following:

(F) a colorant is contained.

14. The active energy ray-curable inkjet printing ink composition according to claim 4, wherein the 1,10-decanediol diacrylate is selected in (D), wherein the 1,10-decanediol diacrylate is one synthesized using a plant-derived compound.

15. The active energy ray-curable inkjet printing ink composition according to claim 4, further satisfying the following:

(F) a colorant is contained.

16. The active energy ray-curable inkjet printing ink composition according to claim 5, further satisfying the following:

(F) a colorant is contained.

17. The active energy ray-curable inkjet printing ink composition according to claim 7, wherein one of the (meth)acrylate monomers in (C) having an alkyl group with 6 to 20 carbon atoms is lauryl acrylate synthesized using a plant-derived compound.

18. The active energy ray-curable inkjet printing ink composition according to claim 7, wherein the 1,10-decanediol diacrylate is selected in (D), wherein the 1,10-decanediol diacrylate is one synthesized using a plant-derived compound.

19. The active energy ray-curable inkjet printing ink composition according to claim 7, further satisfying the following:

(F) a colorant is contained.

20. The active energy ray-curable inkjet printing ink composition according to claim 8, wherein the 1,10-decanediol diacrylate is selected in (D), wherein the 1,10-decanediol diacrylate is one synthesized using a plant-derived compound.

* * * * *